United States Patent
Wu et al.

(10) Patent No.: US 9,699,466 B2
(45) Date of Patent: Jul. 4, 2017

(54) ADAPTIVE REFERENCE/NON-REFERENCE FRAME DETERMINATION FOR VIDEO ENCODING

(71) Applicant: MEDIATEK INC., Hsin-Chu (TW)

(72) Inventors: Tung-Hsing Wu, Chiayi (TW); Kun-Bin Lee, Taipei (TW)

(73) Assignee: MEDIATEK INC, Hsinchu (TW)

( * ) Notice: Subject to any disclaimer, the term of this patent is extended or adjusted under 35 U.S.C. 154(b) by 224 days.

(21) Appl. No.: 14/140,967

(22) Filed: Dec. 26, 2013

(65) Prior Publication Data

US 2015/0189271 A1   Jul. 2, 2015

(51) Int. Cl.
*H04N 19/176* (2014.01)
*H04N 19/103* (2014.01)
*H04N 19/126* (2014.01)
*H04N 19/156* (2014.01)

(52) U.S. Cl.
CPC ......... *H04N 19/176* (2014.11); *H04N 19/103* (2014.11); *H04N 19/126* (2014.11); *H04N 19/156* (2014.11)

(58) Field of Classification Search
CPC .. H04N 19/176; H04N 19/103; H04N 19/126; H04N 19/156
See application file for complete search history.

(56) References Cited

U.S. PATENT DOCUMENTS

| | | | | |
|---|---|---|---|---|
| 6,973,257 | B1* | 12/2005 | Park | G06F 17/30811 360/72.1 |
| 2005/0058207 | A1* | 3/2005 | Magee | H04N 7/52 375/240.26 |
| 2012/0169845 | A1* | 7/2012 | Kim | H04N 13/0048 348/46 |

(Continued)

OTHER PUBLICATIONS

Austin Y. Lan, Anthony G. Nguyen, and Jeng-Neng Hwang, "Scene-Context-Dependent Reference-Frame Placement for MPEG Video Coding," IEEE Transactions on Circuits and Systems for Video Technology, vol. 9, No. 3, Apr. 1999, pp. 478-489.*

(Continued)

*Primary Examiner* — Thai Tran
*Assistant Examiner* — Christopher T Braniff
(74) *Attorney, Agent, or Firm* — McClure, Qualey & Rodack, LLP

(57) ABSTRACT

Methods for determining reference type of each image unit and adjusting the corresponding lambda table of the reference type are disclosed. Embodiments according to the invention are used to improve the quality of video compression or reduce the requirement of memory buffer, memory power or computation power. The reference type is determined based on the encoder system information or image unit information. The frame/slice type structure of a video sequence is adjusted according to the image unit information of encoded frames or together with input frames. By fine-tuning the mode decision process, the coding efficiency can be improved. The mode decision process is modified by (Continued)

adaptively adjusting the lambda table. The lambda table is adaptively determined according to the conventional image unit type (such as Intra coded, predicted or bi-directional predicted type) and the reference type determined.

28 Claims, 14 Drawing Sheets

(56) References Cited

U.S. PATENT DOCUMENTS

| | | | |
|---|---|---|---|
| 2013/0034146 A1* | 2/2013 | Jeong | H04N 7/147 |
| | | | 375/240.01 |
| 2013/0148721 A1* | 6/2013 | Chen | G09G 5/001 |
| | | | 375/240.12 |

OTHER PUBLICATIONS

Benjamin Bross et al., "High Efficiency Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, Jan. 2013, pp. 1-289.*

Ahmad et al., "Selection of Variable Block Sizes in H.264," IEEE International Conference on Acoustics, Speech, and Signal Processing, vol. 3, 2004, pp. 173-176.*

Brian A Heng et al., "End-to-End Rate-Distortion Optimized MD Mode Selection for Multiple Description Video Coding," EURASIP Journal on Applied Signal Processing, vol. 2006, pp. 1-12.*

* cited by examiner

ADAPTIVE REFERENCE/NON-REFERENCE FRAME DETERMINATION FOR VIDEO ENCODING

FIELD OF THE INVENTION

The invention relates to a video coding process and video coding system performing the video coding process. In particular, the invention relates to video coding methods incorporating adaptive reference/non-reference frame determination and modifying mode decision process based on the adaptive reference/non-reference frame determination.

BACKGROUND AND RELATED ART

Adaptive Intra/Inter prediction is a coding technique widely used in the field of video coding, where a frame or an image unit is Intra coded or Inter coded. Before encoding, each video frame or image unit is assigned to a frame (or image unit) type for compressing. The types of frames (or image units) used for compression are Intra-frame or Intra coded frame (I-frame), Predicted frame (P-frame) and Bi-directional predicted frame (B-frame). An I-frame is an Intra-frame in which the image is coded into the data stream and can be reconstructed without referencing other frame or frames. During encoding, an I-frame is a key frame which can be used as a reference frame by other frames. P-frames or B-frames are Inter-frames which are predicted based on other frame or frames. A P-frame incorporates the changes in the image from its previous frame and therefore contains motion-compensated difference information from the preceding I-frame or P-frame. A B-frame contains difference information from the preceding and following I- or P-frames. In traditional video coding method, the frame type structure specifying the arranging order of Intra/Inter frames is settled before encoding. The frame type structure of a video sequence can be represented by a Group Of successive Pictures (GOP) with pre-determined frame types and reference information, wherein the reference information comprises the number of reference frame or frames, the reference direction and the reference distance. For example, the frame type structure for a conventional four pictures GOP may be IBBP, IBPB, IPPP or IIII.

After the frame type for each frame and the frame type structure for a video sequence are determined, the lambda table for each Inter-frame (such as P-frame or B-frame) is assigned. The $\lambda$ values in the lambda table are used for mode decision in video coding. During the process of mode decision, the cost of video compression is estimated for each cost function so as to determine the best compression mode with the minimum cost. The video compression cost corresponding to a coding mode is calculated based on the distortion and the quantity of coded bits. The cost of video compression is calculated using the following equation:

$$\text{Cost} = a * \text{Distortion} + \lambda * \text{Bits} \quad (1)$$

in which 'a' is a constant value associated with the distortion and '$\lambda$' is related to the quantity of coded bits. The $\lambda$ value is calculated according to a given Quantization Parameter (QP) value. The $\lambda$ value can be calculated by the following equation:

$$\lambda = f(QP) \quad (2)$$

If a coding unit of an image is coded with a low QP, the distortion will be lower and the quantity of coded bits will be higher. If the coding unit is coded with a large QP, the quantity of the coded bits will be lower. The $\lambda$ value plays an important role in mode decision of video coding. When the $\lambda$ value is high, the cost of the video compression is more relied on the quantity of the coded bits. On the other hand, the cost of the video compression depends more on the distortion (or the image quality) if the $\lambda$ value is low. Therefore, the $\lambda$ value is a weighting factor between the distortion and the quantity of the coded bits. In traditional methods, the lambda table for each frame of a video sequence is determined in a sequence level. The lambda table is fixed once the frame type structure of the GOP is determined.

The traditional video coding method has some shortcomings with pre-determined frame type structure and fixed lambda table for video coding. In some situations, the pre-determined frame type structure with a fixed lambda table may not perform well in terms of video compression for all scenes. The pre-determined frame type structure or non-adaptive frame type video coding process may cause image quality degradation, particularly in fast motion scenes. The degradation is partially contributed by the manner that each picture is treated as a reference picture or non-reference picture depending on the picture type regardless of the image characteristics. For example, if the frame type structure is "IPPP", each P-frame is predicted by its previous frame (i.e., an I-frame or a P-frame). In other words, each P-frame is coded as a reference picture except for the last P-frame in a group of pictures coded using "IPPP". If a fast motion or a scene change occurs in the first P-frame in the sequence with "IPPP" coding structure, the first P-frame will require a higher bit-rate to code. Nevertheless, the conventional coding technique uses fixed coding structure and may not be able to use the available bit-rate budget efficiently. On the other hand, if high data rate is allocated to the first P-frame in this case, the system may not have enough bit-rate to allocate to subsequent P-frames. Therefore, the fixed frame type structure won't be able to adapt to the frame characteristics. The lambda table used in a conventional coding system does not take into account the frame characteristics either. Therefore, it could not adapt to frame characteristics to weigh more on the image quality (or distortion) or the bits.

For a picture that is referenced by another picture in the image sequence, the referenced picture has to be reconstructed and used as a reference picture by another picture in the encoder. Therefore, a referenced picture will consume more processing power and more memory bandwidth. However, in a conventional coding system, the required computational power and required system bandwidth are about fixed for a fixed frame type structure. It cannot adapt to the particular computational power or memory bandwidth of a given coding system. It is desirable to develop an adaptive method to determine frame type structure and lambda table for video coding to improve performance or to adapt to the system processing power or system bandwidth limitations.

BRIEF SUMMARY OF THE INVENTION

Video encoding methods are disclosed in the invention. According to one embodiment of the invention, the method comprises receiving video data associated with an image unit of a picture, determining a reference type of the image unit and encoding the video data according to the reference type determined. The reference type of the image unit is determined according to encoder system information or image unit information. The encoder system information is associated with a picture encoder used to encode the video data. The image unit information is derived from the image unit. The reference type denotes the image unit is referenced or non-referenced. The image unit may be one frame or one slice and wherein the slice consists of a group of coding units. The method may also comprise modifying mode decision process for the image unit. The method may further comprising determining an image unit type for the image unit, wherein the image unit type is selected from a type group comprising Intra coded reference type, Intra coded non-reference type, predicted reference type, predicted non-reference type, bi-directional predicted reference type and bi-directional predicted non-reference type. The method may also comprise receiving encoder configuration information of the picture encoder and modifying mode decision process in the picture encoder for encoding the image unit. The encoder configuration information comprises image unit type, bit-rate, frame rate, image resolution, profile, and on/off information of coding tools. When the reference type determined corresponds to non-referenced video, at least one of the first information associated with the image unit is not referenced by other image unit in the decoding process. The first information is selected from motion vector information, orientation of Intra prediction, quantization steps, quantization parameters, a transform size, transform coefficients or any combination thereof.

The method may further comprise: collecting the encoder system information from one or more external devices for determining the reference type of the image unit. The reference type is determined according to the encoder system information to reduce load of one or more external devices or to improve coding efficiency. Said one or more external devices may be located in a previous or following stage of a video compressor, or embedded in the video compressor. Said one or more external devices may correspond to: one or more frame processing engines selected from an image signal processor (ISP), a graphic processing unit (GPU), or a display device; one or more motion filters; one or more positional sensors; a transmission device; a receiving device; or any combination thereof. The transmission device or the receiving device can be wireless or wired. The encoder system information may correspond to: bandwidth information; power information; channel capability information; computation capability information; timing budget information; and any combination thereof. The load of said one or more external devices may correspond to quantity of bandwidth, power, channel capability, computation capability or a timing budget.

The method may further comprise analyzing or receiving the image unit information and the reference type is determined according to the image unit information. The image unit information may be selected from: motion information between the image unit and at least one previous image unit; spatial information of the image unit, at least one previous image unit, or both; and temporal information extracted from the spatial information. The spatial information may comprise pixel values, variances, an Intra-prediction direction and frequency response. The image unit information may be obtained from a first device in a previous stage of the picture encoder, a second device embedded in the picture encoder, or both. The first device corresponds to an image signal processor (ISP) or pre-processing elements.

According to another embodiment of the invention, the video encoding method comprises: receiving video data associated with image units of a video sequence; determining image unit information associated each image unit; determining an image unit type structure for the image units and applying encoding to the video data according to the reference types determined. The image unit type structure for the image units is determined according to the image unit information. The image unit type structure comprises a reference type of each image unit and the reference type denotes the image unit to be referenced or non-referenced. The image units may correspond to a first group of frames or a second group of slices in which each slice consists of one or more coding units. The method may further comprise modifying mode decision process for said each image unit.

The image unit information may be selected from: motion information between the image unit and at least one previous image unit; spatial information of the image unit, at least one previous image unit, or both; temporal information extracted from the spatial information; or any combination thereof.

The image unit type structure may comprise the image unit type and reference information of each image unit. The reference information comprises the number of reference frames, reference directions and reference distance. The image unit type is selected from a type group comprising reference Intra coded type, non-reference Intra coded type, reference predicted type, non-reference predicted type, reference bi-directional predicted type, non-reference bi-directional predicted type and any combination thereof. The image unit type structure may be determined after coding one or more previous image units. The image unit type structure may be determined assistant with encoded information of one or more previous image units or pre-analysis information of un-coded image units. The un-coded image units may be selected from current image units and the following image units.

According to another embodiment of the invention, the method comprises receiving video data associated with a current frame; determining first information associated with one or more previous encoded frames; determining a lambda table based on design information comprising the first information; determining coding parameters for the current frame based on the lambda table; and encoding the current frame using the coding parameters determined. The method may further comprise determining second information associated with the current frame, wherein the design information comprises the second information. The first or the second information may be selected from motion vector information, an Intra mode ratio, an Inter mode ratio, a ratio of specific coding modes, frame rate, bit-rate, encoded bits, a frame type or any combination thereof. The frame type is used to identify the current frame to be a reference Intra coded frame, non-reference Intra coded frame, reference predicted frame, non-reference predicted frame, reference bi-directional predicted frame or non-reference bi-directional predicted frame.

DETAILED DESCRIPTION OF THE INVENTION

In the invention, a method of adaptively determining reference/non-reference type and lambda table for image units in a video coding system is illustrated. The image unit can be a frame or a slice, where each slice consists of a group of coding units. The reference type denotes each image unit to be referenced or non-referenced by other image units. Therefore, the image unit can be assigned to be a reference Intra coded type, non-reference Intra coded type, reference predicted type, non-reference predicted type, reference bi-directional predicted type, and non-reference bi-directional predicted type and so on. Thus, one frame can be determined as a reference I-frame, non-reference I-frame, reference P-frame, non-reference P-frame, reference B-frame or non-reference B-frame, etc.

To determine the image unit (e.g. frame or slice) type structure of a video sequence or a group of image units, adaptive methods are used to determine a reference type of each image unit. Then the image unit type structure is adaptively determined or adjusted according to the reference types determined. The lambda table corresponding to each image unit is also adaptively adjusted according to the determined reference type so that the mode decision process can be modified according to the lambda table.

If one or more information of one image unit is referenced by other image unit in the decoding process, the image unit is defined as a reference image unit in the invention. The image unit information includes pixel information, temporal information and spatial information. The pixel information may be the reconstructed pixel value, the temporal information may be the motion vector of the image unit and the spatial information may be Intra prediction information, quantization information or transform information of the image unit.

Figure 1:
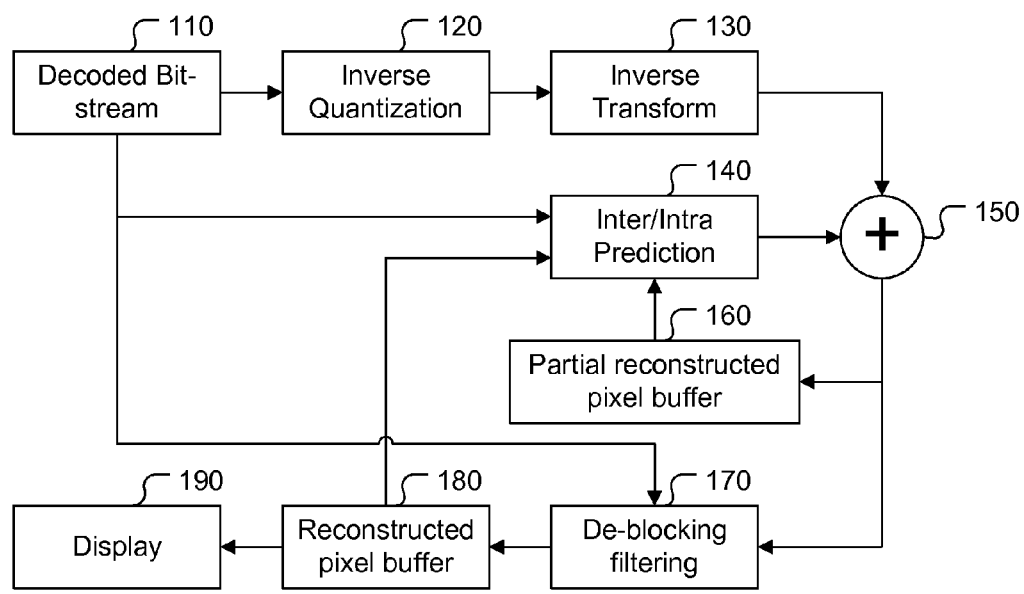
FIG. 1 illustrates an exemplary system block diagram for a video decoder using adaptive Intra/Inter prediction.
Figure 2:
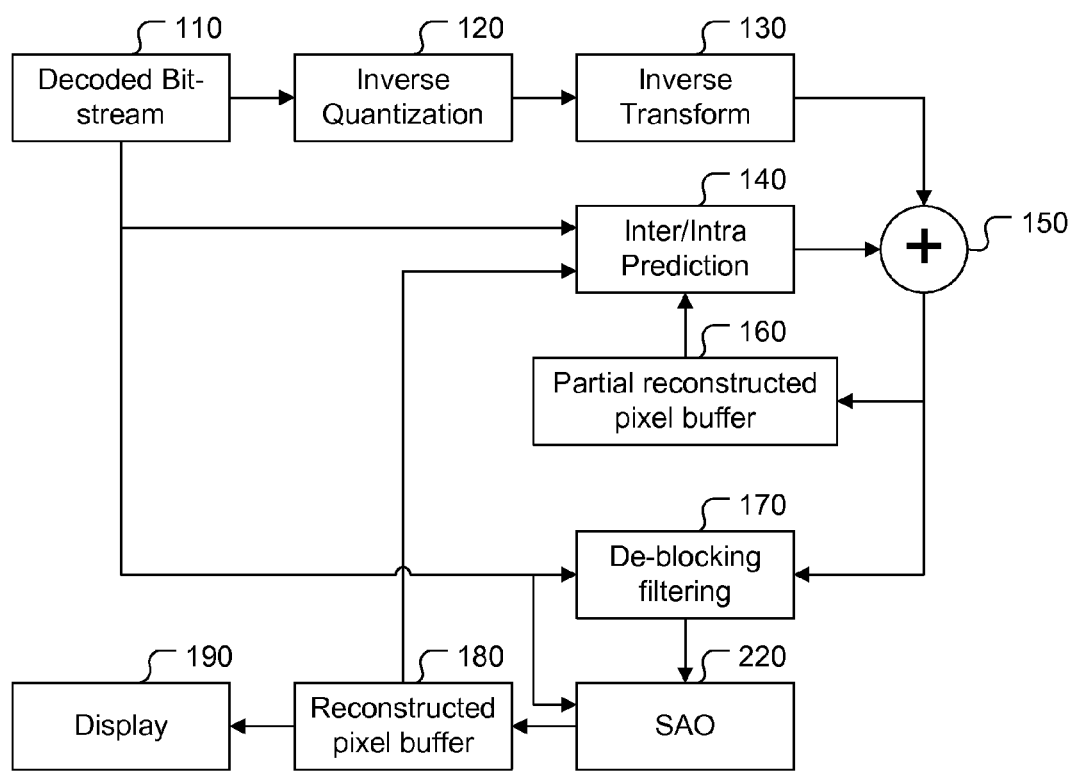
FIG. 2 illustrates another exemplary system block diagram for a video decoder using adaptive Intra/Inter prediction and de-blocking filter/sample adaptive offset (SAO).
Figure 3:
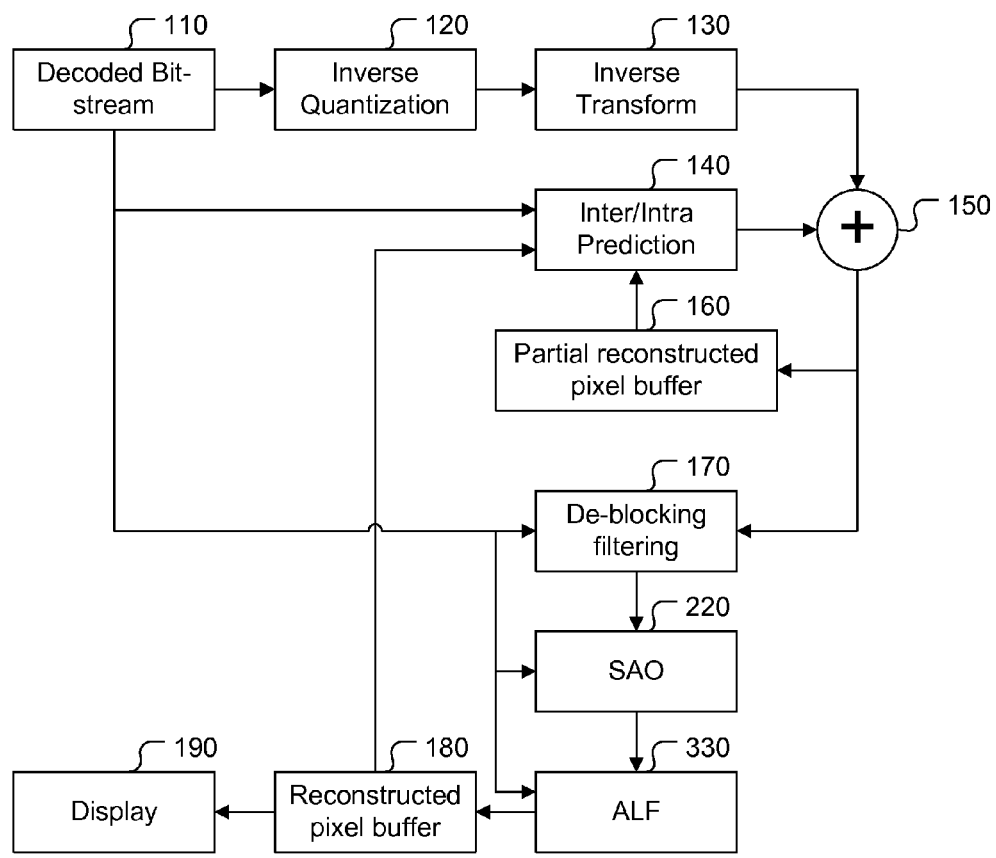
FIG. 3 illustrates another exemplary system block diagram for a video decoder using adaptive Intra/Inter prediction and de-blocking filter/sample adaptive offset (SAO)/adaptive loop filter (ALF).

For video compression, all the image unit information used to predict other image units is determined at the encoder side. The image unit information is signaled in the bit-stream of coded video data so that it can be recovered at the decoder side. Therefore, the image unit information can be recovered from the bitstream. FIGS. 1 to 3 illustrate exemplary decoder systems for generating reconstructed pixels.

FIG. 1 illustrates an exemplary system block diagram of a video decoder using adaptive Intra/Inter prediction. Decoded bit-stream 110 includes coded data such as residues of Intra or Inter predicted blocks. Decoded bit-stream 110 also includes motion information and other coding information, such as quantization parameters, required to perform the decoding tasks. Decoded bit-stream 110 is processed by inverse quantization 120 and invers transformation 130 to reconstruct the residues coded by Intra or Inter prediction. The reconstructed residues from inverse transform 130 are added to prediction data from Inter/Intra predication 140 using adder 150 to form reconstructed video data. Partial reconstructed pixel buffer 160 may be used to improve memory access efficiency for Inter/Intra prediction. De-blocking filter 170 is then applied to the decoded video data to improve video quality by reducing noise particularly around block boundaries. The result of de-blocking is stored in reconstructed pixel buffer 180. The reconstructed pixels in buffer 180 are also provided for Inter/Intra prediction 140. As shown in FIG. 1, Inter/Intra prediction 140 also receives data (e.g., coding types, motion vectors, Intra prediction modes, etc.) from decoded bitstream 110 to perform Inter/Intra prediction. Furthermore, de-block filter 170 also receives data (e.g., de-blocking filter parameters) from decoded bitstream 110 to perform de-blocking. The final result from reconstructed pixel buffer 180 can be used for display of the video data.

FIGS. 2 and 3 illustrate another two exemplary system block diagrams for a video decoder using adaptive Intra/Inter prediction. The decoder system in FIG. 2 is substantially similar to the decoder system in FIG. 1 except for the additional SAO module (220). The similar modules are assigned the same reference numbers as FIG. 1. Sample adaptive offset (SAO) 220 is applied to de-blocked data from de-blocking filter 170 to further improve video quality. As shown in FIG. 2, SAO 220 receives data (e.g., SAO type and SAO offset values) from decoded bitstream 210 to apply SAO properly. The decoder system in FIG. 3 is also substantially similar to the decoder system in FIG. 2 except for the additional ALF module (330). The similar modules are assigned the same reference numbers as FIG. 2. ALF 330 is applied to the processed data from SAO 220 to further enhance video quality. ALF 330 also receives filter information associated with ALF from decoded bitstream 310 to apply ALF properly.

In the invention, the reference type of the image unit may be determined based on the encoder system information, the image unit information, or the encoder system information as well as the image unit information. The encoder system information is associated with a video coding system used to encode the video data. The encoder system information can be selected from the bandwidth information, the power information, the channel capability information, the computation capability information, and the timing budget. The image unit information is derived from the image unit.

The video coding system may benefit from adaptively determining the reference type of the image unit to reduce the loading of the external device. The video coding system may further benefit from adaptively determining the reference type of the image unit to improve the coding efficiency or improve the quality of the reconstructed video image. If it is used to reduce the load, the external device can be a frame processing engine such as an image signal processor (ISP), graphic processing unit (GPU). The external device may also correspond to a display processor, a motion filter, a positional sensor, a transmission device or a receiving device. The transmission device or the receiving device can be a wireless or wired device. The load denotes the quantity of one of the following information: the bandwidth, power, channel capability, computation capability and timing budget of the external device.

Figure 4A:
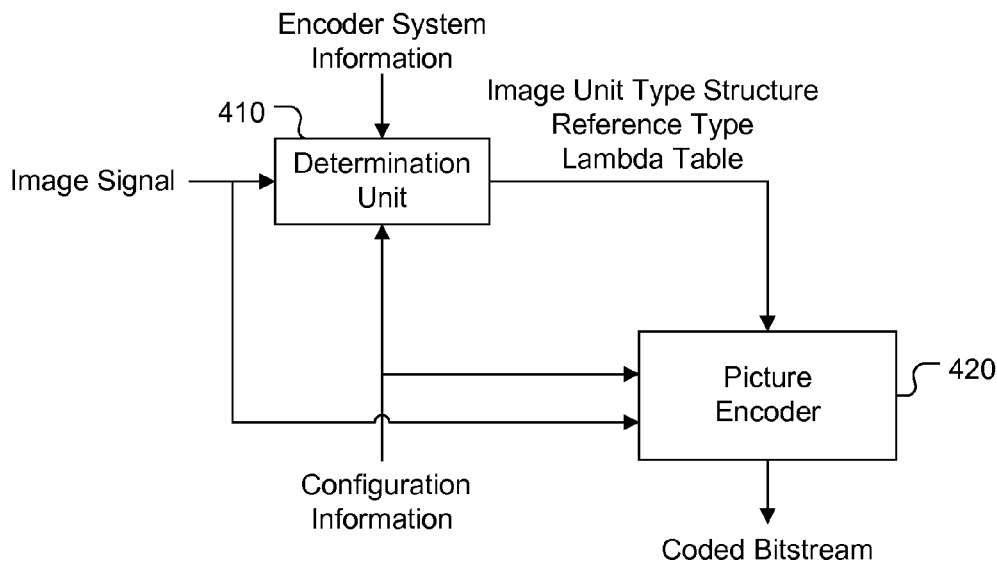
FIG. 4A illustrates an exemplary video coding system according to one embodiment of the invention.
Figure 4B:
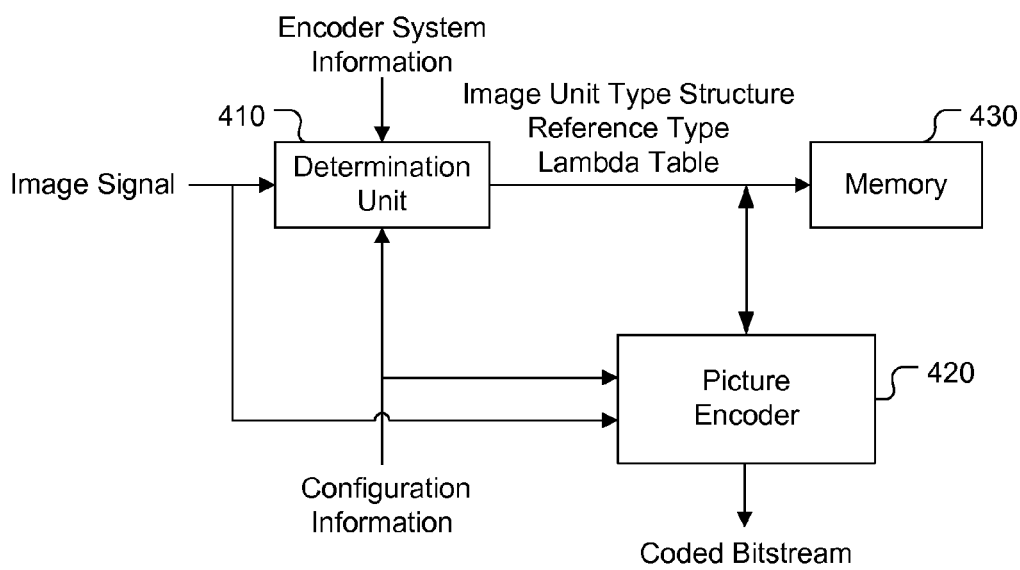
FIG. 4B illustrates an exemplary video coding system according to another embodiment of the invention.

FIG. 4A illustrates an exemplary video coding system of the invention. The video coding system includes a determination unit 410 and a picture encoder 420. The determination unit 410 receives the image signal, encoder system information, and configuration information. The determination unit 410 is configured to adaptively determine the reference type and the lambda table of an image unit. The determination unit 410 is also configured to adaptively determine the image unit type structure of a group of image units. In this embodiment, the determination unit 410 sends the reference type and the lambda table of an image unit and the image unit type structure of a group of image units to the picture encoder 420. The picture encoder 420 may be a video encoder, moving picture encoder, or image encoder. The picture encoder receives the image signal, the reference type and the lambda table of respective image units, the image unit type structure of the group of image units, and the encoder configuration information to set up the encoder operation. The picture encoder 420 encodes the image signal to produce coded bitstream according to the reference type, the lambda table, the image unit type structure, and the encoder configuration information. In yet another embodiment, the determination unit 410 may store the reference type and the lambda table of an image unit to an information list, and the image unit type structure of a group of image units to the memory 430 as shown in FIG. 4B. The picture encoder 420 receives the reference type and the lambda table of an image unit and the image unit type structure of a group of image units from the memory 430.

Figure 5A:
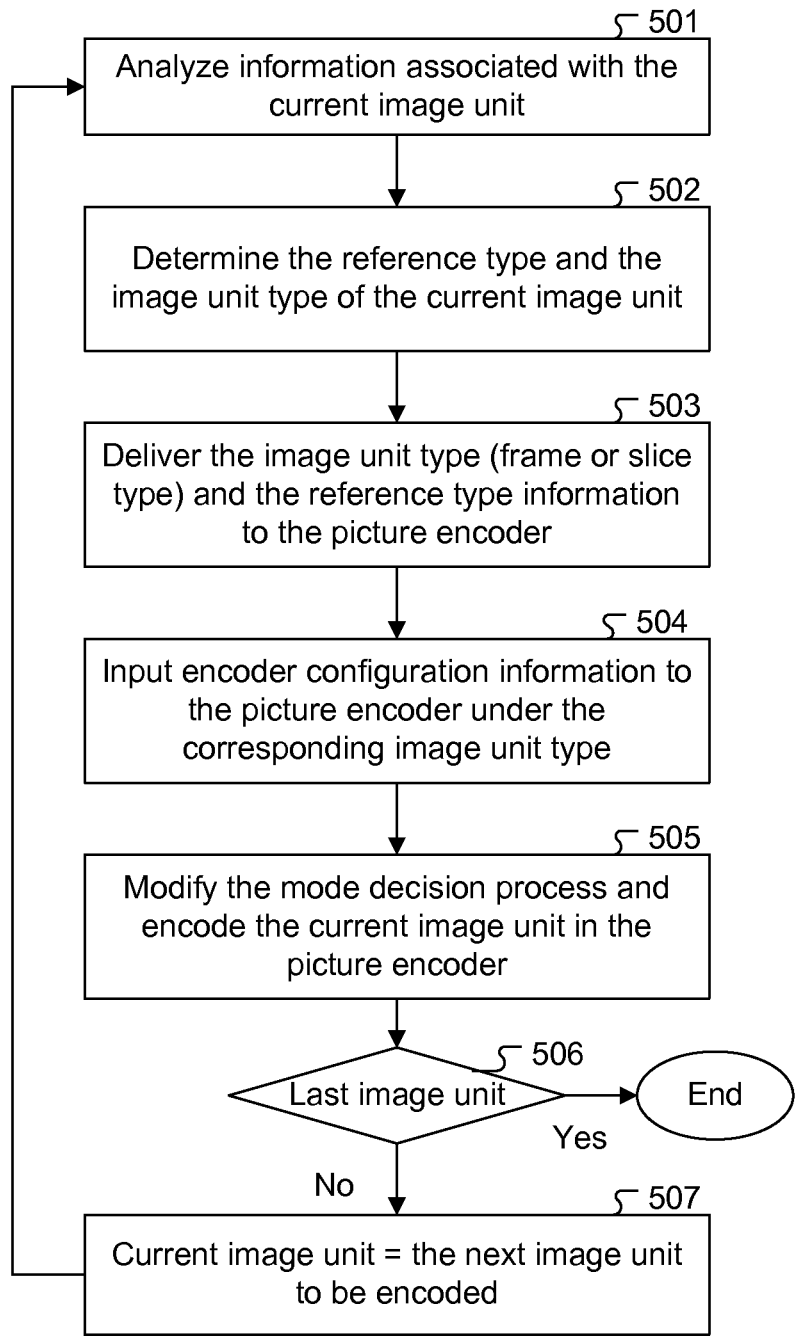
FIG. 5A illustrates an exemplary flow chart of video coding procedure of a video coding system incorporating adaptive reference/non-reference frame selection according to one embodiment of the invention.

FIG. 5A illustrates an exemplary flow chart of video coding procedure of a video coding system, where the reference type of each image unit is adaptively determined. The image unit can be a frame or a slice as mentioned in above and each slice consists of one or more coding units of the video image. The reference type is determined based on the encoder system information, the image unit information, or the encoder system information as well as the image unit information. For each image unit from a video stream, the information associated with the current image unit is analyzed first before encoding as shown in step 501. The reference type is then determined based on the analysis result as shown in step 502. Furthermore, the frame type or slice type (such as I, P or B type) can also be determined along with the reference/non-reference decision for the current image unit in step 502. For example, if the image unit corresponds to a frame, the current frame can be set as a reference I-frame, non-reference I-frame, reference P-frame, non-reference P-frame, reference B-frame or non-reference B-frame, or other.

The image unit type information and the reference type information are delivered to the picture encoder in step 503. Besides the information of the determined image unit type and reference type, the encoder also needs other configuration information, e.g. the encoder configuration information, to set up the picture encoder operation properly. Therefore, the encoder configuration information for the corresponding image unit is derived or provided to the picture encoder as shown in step 504. The encoder configuration information refers to the parameters used for video encoding, such as bit-rate, frame rate, image resolution, profile, On/Off information of coding tools. According to the encoder configuration information, the mode decision process is modified for the current image unit and then the current image unit is encoded in step 505. While the encoder configuration information is provided, the encoder will perform rate-distortion optimization process or other decision process to select a "mode" to achieve an optimal or better performance. For example, the encoder may decide: whether to apply Intra or Inter coding to the underlying image unit; which quantization parameter (QP) set to use, or whether to partition a block into sub-blocks for coding or prediction operation. In step 506, the process is performed to determine whether it is the last image unit to be coded. If the current image unit is not the last image unit, the next image unit to be encoded is selected in step 507 as the current image unit to be processed by the processes before encoding.

Figure 5B:
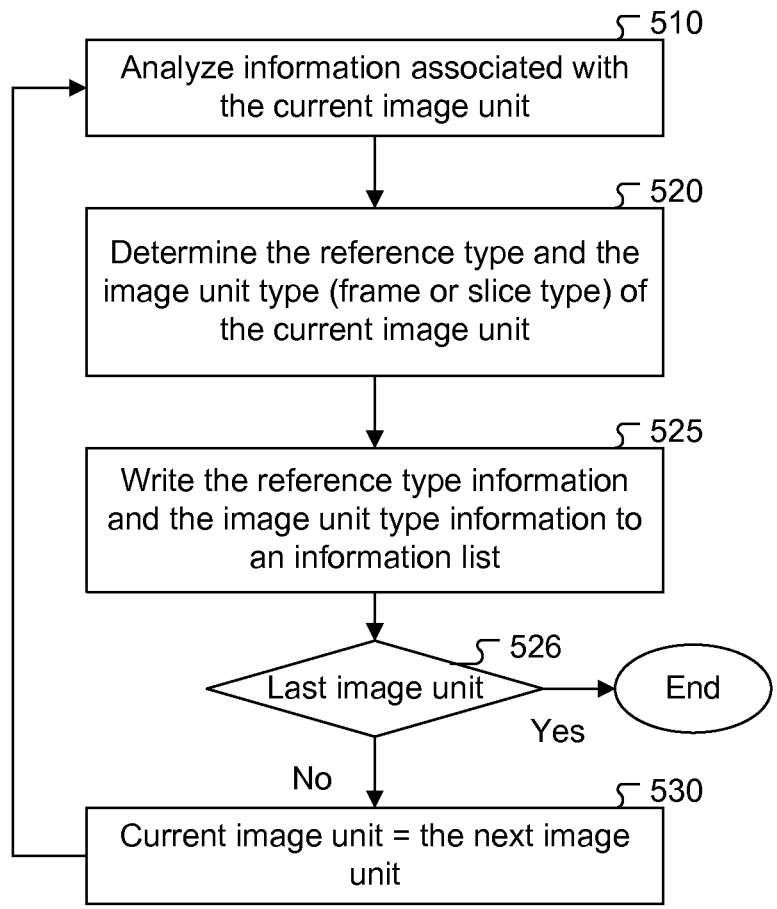
FIG. 5B illustrates an exemplary flow chart of adaptive reference/non-reference frame selection for a group of image units based on image unit information.
Figure 5C:
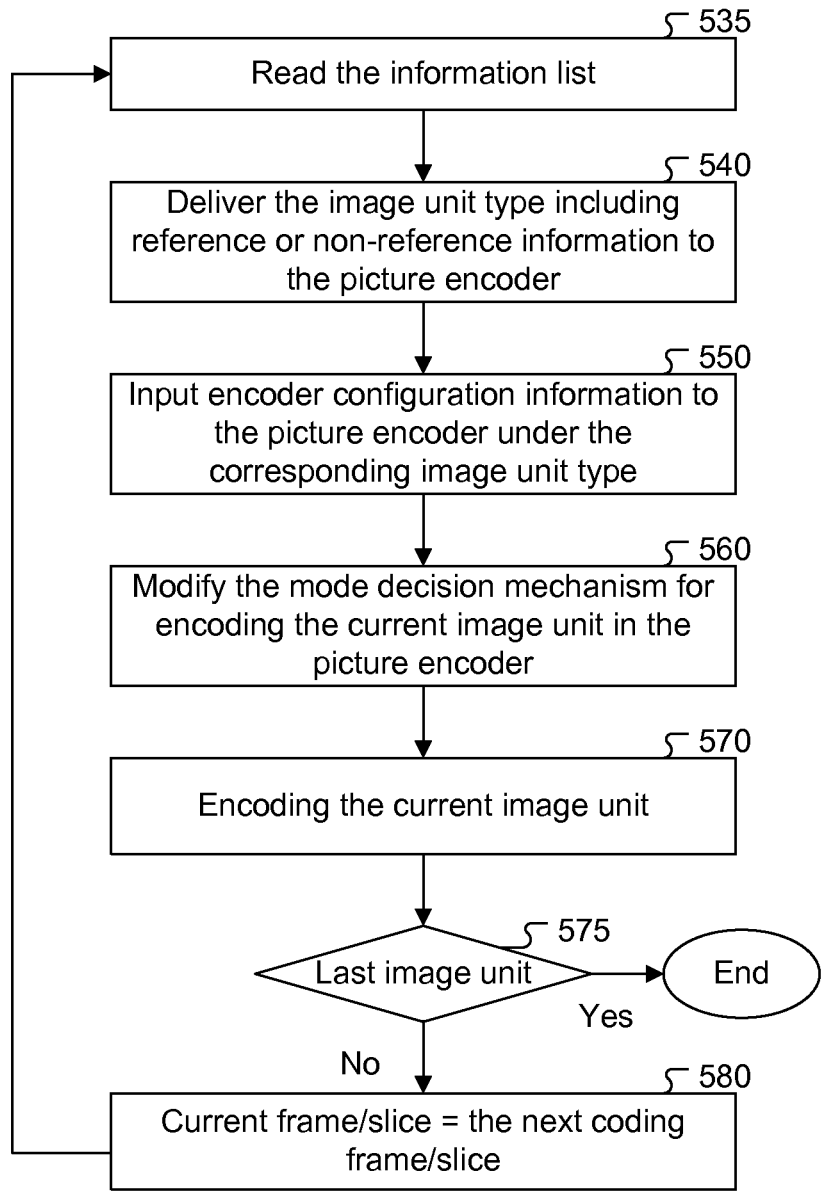
FIG. 5C illustrates an exemplary flow chart of video coding procedure of a video coding system that modifies the frame/slice type structure based on the determined reference types according to one embodiment of the invention.

FIGS. 5B and 5C illustrate another exemplary flow chart of video coding procedure of a video coding system including adaptive reference/non-reference frame selection and modification of image unit type structure of a group of image units. The group of image units consists of one or more image units. Each image unit can be a frame or a slice as mentioned before and each slice consists of one or more coding units of the video image. The reference type of each image unit is determined first and written into an information list, as shown in FIG. 5A. For encoding each image unit of the group, the information of the image unit type is read from the information list and delivered to the encoder as shown in FIG. 5B.

To determine the image unit type for each image unit, the information associated with the current image unit, such as the image unit information, the encoder information, or the image unit information as well as the encoder information, is analyzed in step 510. The reference type is determined based on the analysis result as shown in step 520. In addition, the frame type or slice type is also determined with the reference/non-reference decision for the current image unit. The reference type information and the frame or slice type information is stored in an information list in step 525. The information list can be stored in memory 430. In step 526, it is determined whether the current image unit is the last image unit of the group. If the current image unit is not the last one, the next image unit is selected to be processed for determining the image unit type in step 530 until all image units of the group has been assigned with reference types.

When the image unit is going to be encoded, the reference type and the image unit type information is read from the information list in step 535 and then delivered to the picture encoder in the following step 540. In addition to the information of the determined image unit type and reference type, the encoder also needs other configuration information, e.g. encoder configuration information, to set up the picture encoder operation. Thus, the encoder configuration information is delivered or provided to the picture encoder as shown in step 550. The encoder configuration information includes bit-rate, frame rate, image resolution, profile, On and Off information of coding tools, or any combination of the foregoing. According to the encoder configuration information of the picture encoder, the mode decision process is modified for the current image unit in step 560. While the encoder configuration information is provided, the encoder will perform rate-distortion optimization process or other decision process to select a "mode" to achieve an optimal or better performance. For example, the encoder may decide: whether to apply Intra or Inter coding to the underlying image unit; which quantization parameter (QP) set to use, or whether to partition a block into sub-blocks for coding or prediction operation. To further enhance coding efficiency or reduce the load of the encoding system, the frame or slice type structure is also be modified in step 560. After all parameters for encoding is provided or delivered to the encoder, the current image unit is encoded in step 570 according to the determined reference type and the image unit type. In step 580, the next image unit is selected as the current image unit to be encoded.

Different from the flow chart as shown in FIG. 5A, in one embodiment of the invention, the image unit (e.g. frame or slice) type structure may also be determined before, parallel with or after modifying the mode decision process in step 560. The image unit type structure, which specifies the order and the reference relationship of a group of image units, may be determined based on the other configuration information. The configuration information to be used can be encoding scene, high or low quality mode, high or low power mode, or high or low bandwidth mode information. When the input configuration information indicates the group of image units is in a large motion scene, high quality mode, high power mode or high bandwidth mode, more image units are coded as reference image units to improve the reconstruction quality. Vice versa, more image units are coded as non-reference image units to improve the coding efficiency or reduce the load of the video coding system. If one or more group of image units are encoded, the frame or slice type structure can also be determined according to the information of previous encoded image units or pre-analysis information of the input frames or slices. The information of encoded image units to be used to determine the frame or slice structure can be derived from the reconstructed pixels in the video coding system.

Figure 6:
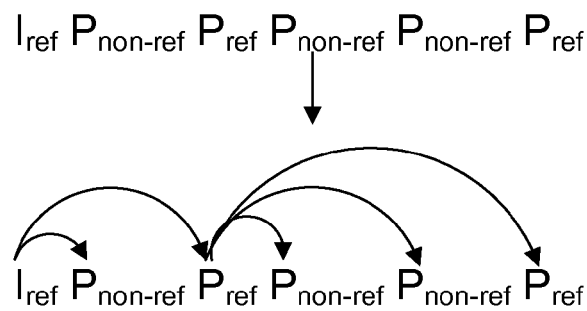
FIG. 6 illustrates an example of an IPPPPP video sequence with adaptive reference/non-reference frame selection according to an embodiment of the invention.

FIG. 6 shows an example of the frame type structure of a video sequence determined according to an embodiment of the invention, where the image unit corresponds to a frame. The video sequence consists of six frames. The pre-determined image unit type (i.e., frame type) is denoted as $I_{ref}$ $P_{non-ref}$ $P_{ref}$ $P_{non-ref}$ $P_{non-ref}$ $P_{ref}$ as shown in FIG. 6. In the invention, "non-ref" represents non-referenced video and "ref" represents referenced video. Each arrow illustrates the reference relationship from the reference frame to the Inter-frames to be predicted by the reference frame. According to an embodiment of the invention, the reference/non-reference decision can be performed based on encoder system information, image unit information, or the encoder system information as well as the image unit information. For example, when the analysis indicates that the current frame contains large motion scenes, the current frame is coded as a reference frame. Otherwise, it is coded as a non-reference frame. Since the coded data related to the non-reference frame/slice will not be used as reference data for processing other frames/slices, reconstructed pixel values of the non-reference frame/slice don't have to be written back to reference memory. Therefore, the use of non-reference frames/slices will result relief the requirement of the processing power and the memory bandwidth. The coding efficiency will be improved by fine tune the mode decision process of reference or non-reference frame. The coding structure of the video sequence shown in FIG. 6 is suitable for low latency application due to no B type frame.

Figure 7:
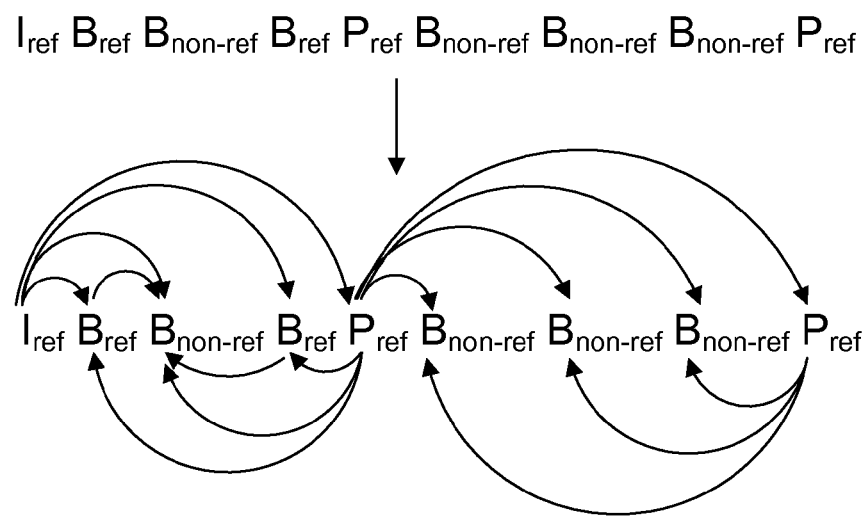
FIG. 7 illustrates another example of an IBBPBBP video sequence with adaptive reference/non-reference frame selection according to an embodiment of the invention.

FIG. 7 illustrates another example of a video sequence with the frame type structure determined according an embodiment of the invention. The pre-determined image unit type or frame type is denoted as $I_{ref}$ $B_{ref}$ $B_{non-ref}$ $B_{ref}$ $P_{ref}$ $B_{non-ref}$ $B_{non-ref}$ $B_{non-ref}$ $P_{ref}$. The reference relationship between reference frames and Inter-frames are illustrates by the arrows. As many B type frames determined for the video sequence, the coding structure of the video sequence is not suitable for low latency application. In traditional coding methods, B type frames are usually not referenced by other frames. However, B type frames in one embodiment of the invention can be used as either a reference or non-reference frame, such as in the example shown by FIG. 7. When more computation power is available, the number of the reference frames can be increased.

Figure 8:
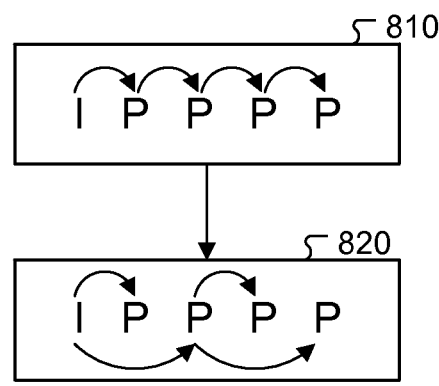
FIG. 8 illustrates an example of an IPPPP video sequence with adaptive reference/non-reference frame selection according to one embodiment of the invention.

FIG. 8 illustrates an example of a video sequence with frame type structure adjusted according to one embodiment of the invention. In this example, the frame type of the video sequence is pre-determined as IPPPP in which each Inter-frame is predicted by the previous frame. The pre-determined frame type structure is illustrated by the arrows shown in 810. The frame types are determined according to a high bandwidth mode. If the configuration information of the current video sequence indicates a low bandwidth mode, the frame type structure of the video sequence can be adjusted to use less reference frames. For example, only the first frame "I" and the third frame "P" are used as reference frames. The adjusted reference relationship is illustrated by the arrows shown in 820. The requirement of bandwidth is reduced due to the fact that the data of non-reference frames are not written out.

Figure 9:
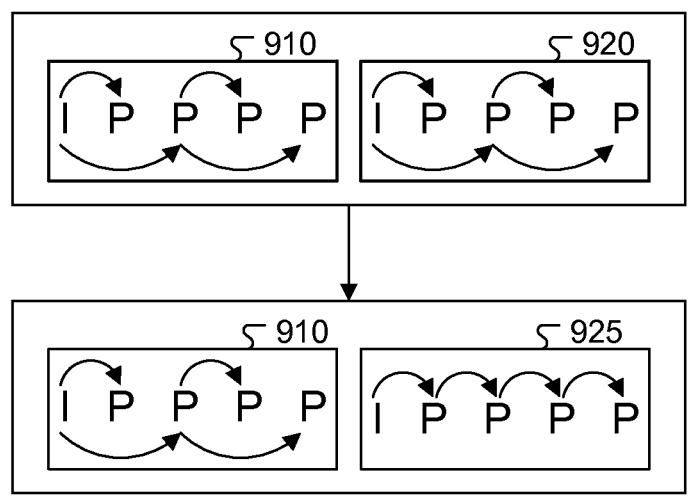
FIG. 9 illustrates an example of an IPPPPIPPPP video sequence with adaptive modification of the frame type structure according to one embodiment of the invention.

FIG. 9 illustrates an example of frame type structure being adjusted according to another embodiment of the invention. The video sequence includes two adjacent groups of frames 910 and 920. Each group consists of five frames with pre-determined frame types "IPPPP". In each group, the first and the third frames are pre-determined as reference frames and the other three frames are assigned as non-reference frames based on a low motion mode. After encoding the first group of frames, the frame type structure of the second group is adjusted according to the previous coding information or the pre-analysis information of input frames. As shown in FIG. 9, the frame type structure of the second group 920 is adjusted when the information used to determine reference types indicates the group is in a high motion mode. The number of reference frames increases to improve quality of reconstructed video picture. The first four frames of adjusted group 925 are used as reference frame and the reference relationship is shown by the arrows in FIG. 9.

After the determination of the frame type and the reference type of each frame, the mode decision process or the coding mechanism is modified as shown in FIGS. 5A-5C. To modify the mode decision process, the lambda table is adaptively adjusted according to the conventional frame type and the reference type. For a given QP value, the lambda value varies according to the frame type and the number of the frame types in a video sequence. For example, the lambda value of P frames is different with B frames for a given QP value. When the number of B frames between two key frames (I-frame or P-frame used to predict other frame or frames) changes, the lambda value of the B frames varies according to the number. According to the invention, the lambda table for each frame is adaptively adjusted to find the better lambda values which will result in the improvement of the coding efficiency. Therefore, the coding efficiency can be improved by fine-tuning the mode decision process.

The lambda table is determined based on the design information associated with the frame to be processed. The design information is the information of the previous encoded frame(s) or the analysis information of the input frame(s). The design information is selected from the motion vector, Intra mode ratio, Inter mode ratio, ratio of specific coding modes, frame rate, bit-rate, encoded bits, frame type or any combination thereof. In the invention, Intra mode ratio is defined as the portion of macro blocks (MBs) which are encoded by Intra mode of a frame or frames. For example, if the number of MBs encoded by Intra mode in one frame is X and the total number of MBs is N, then the Intra mode ratio of the frame is X/N. If the numbers of MBs encoded by Intra mode in frame 1 to frame n are denoted as $X_1$ to $X_n$, the Intra mode ratio of the n frames is $(X_1+X_2+\ldots+X_n)/N$. If weighting factors are also considered in the calculation of the Intra mode ratio, the Intra mode ratio of the n frames is $(a_1X_1+a_2X_2+\ldots+a_nX_n)/N$ in which $a_1$ to $a_n$ represent the corresponding weighting values of these frames, respectively. Similarly, Inter mode ratio means the portion of macro blocks (MBs) are encoded by Inter mode in a frame or frames. For ratio of specific mode, it is used to represent the portion of MBs coded by a specific mode. The specific mode is referred to a specific coding mode which can be intra 4×4 mode, intra 8×8 mode, intra 16×16 mode, skip mode, inter 16×16 mode, etc.

Figure 10:
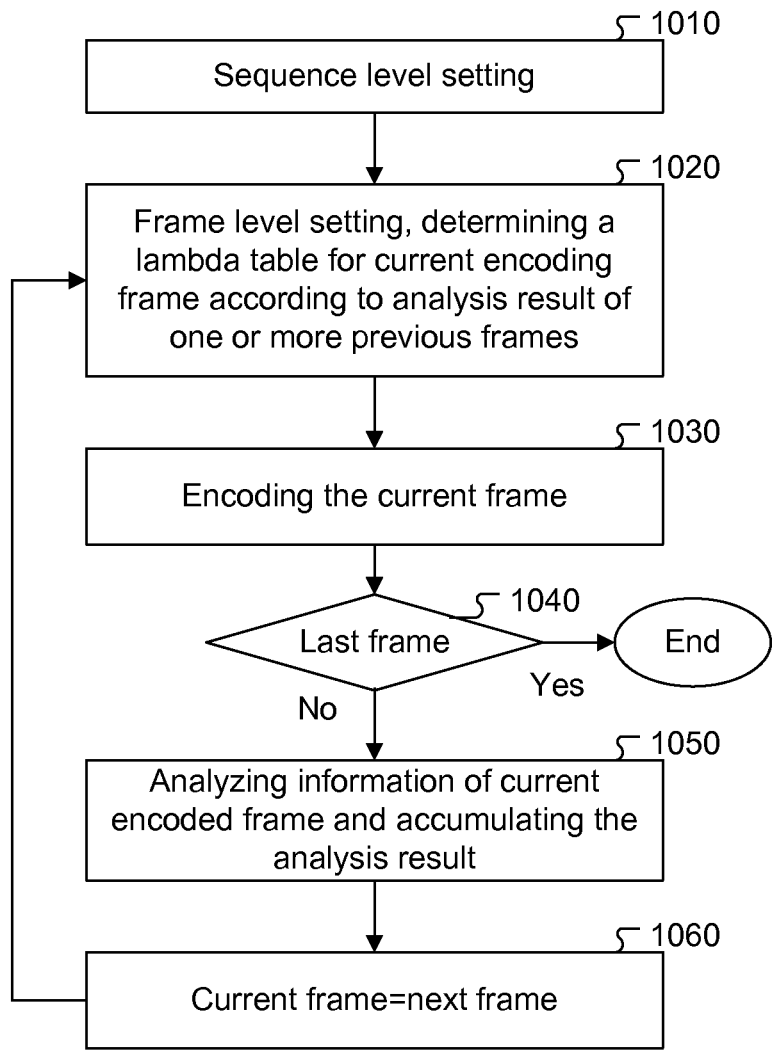
FIG. 10 illustrates an exemplary flowchart of determining a lambda table according to one embodiment of the invention.

FIG. 10 illustrates an exemplary flow chart of the video coding procedure of a video coding system with adaptive lambda table decision based on the analysis information of previous encoded frame or frames. The lambda table for each frame is determined in frame level according to one embodiment of the invention. The sequence level setting in step 1010 is used to perform the initialization of the video coding system. The parameters for coding the video sequence are determined in sequence level except the lambda table. In step 1020, frame level setting may be the encoder configuration for encoding one frame, and the lambda table is determined according to the information of one or more previous encoded frames. Then the video coding system encodes the current frame according to the determined lambda table in step 1030. If the current frame is the last frame of the video sequence, the encoding of the sequence ends. Otherwise, the current frame is analyzed to generate information which will be used to determine the lambda table for the next frame and the information of one or more encoded frames is accumulated in step 1050. The next frame to be processed in the frame sequence is set as the current frame in step 1060.

Figure 11:
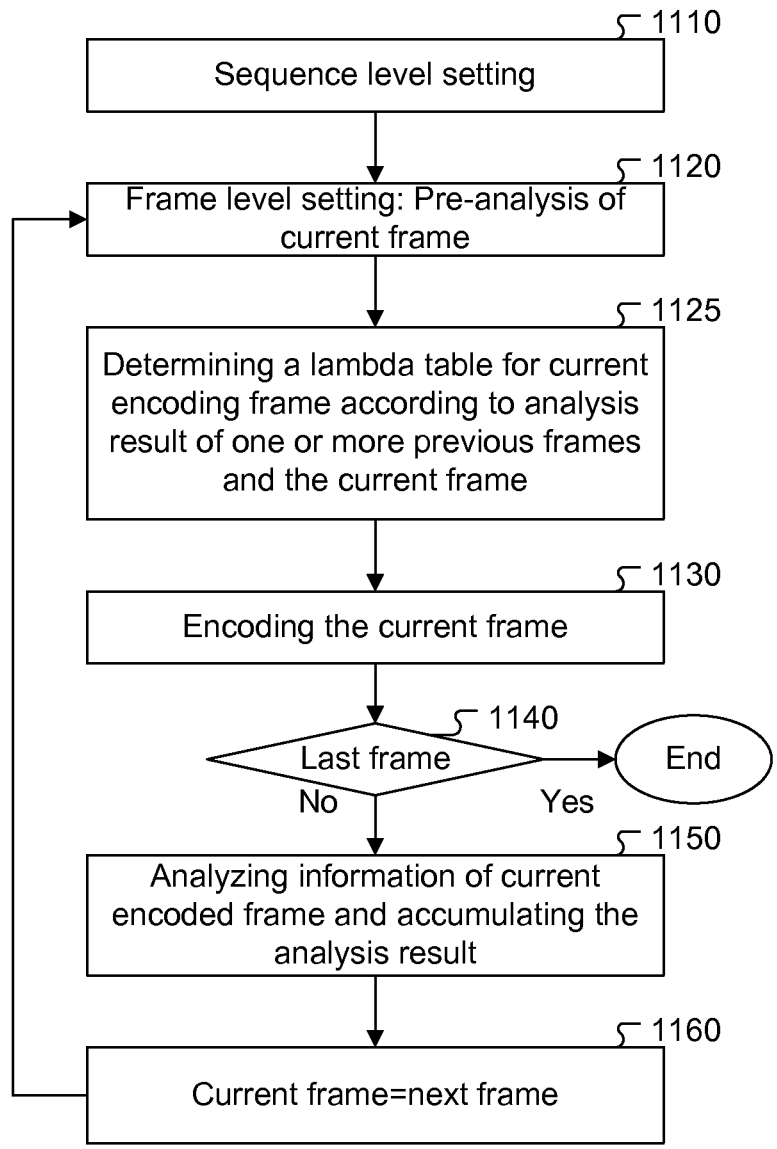
FIG. 11 illustrates an exemplary flowchart of determining a lambda table according to another embodiment of the invention.

FIG. 11 illustrates another exemplary flow chart of the video coding procedure of a video coding system with adaptive lambda table decision based on pre-analysis information of the input frames and the information of previously encoded frames. In this exemplary flow chart, the lambda table for each frame is also determined in the frame level. The initialization of the video coding system is performed in step 1110. The parameters for coding the video sequence are determined in sequence level except the lambda table. Frame level setting begins from step 1120. In order to determine the lambda table for the current frame, the information of the current frame is pre-analyzed in step 1120. In step 1125, the lambda table for the current frame is determined based on the information of the current frame and one or more previous encoded frames. Then the video coding system codes the current frame according to the determined lambda table in step 1130. If the current frame is the last frame of the sequence, the encoding of the sequence ends. Otherwise, the current frame is analyzed to generate information which will be used to determine the lambda table for the next frame in step 1150 and the information of one or more encoded frames is accumulated. The next frame to be processed in the frame sequence is set as the current frame in step 1160.

Figure 12:
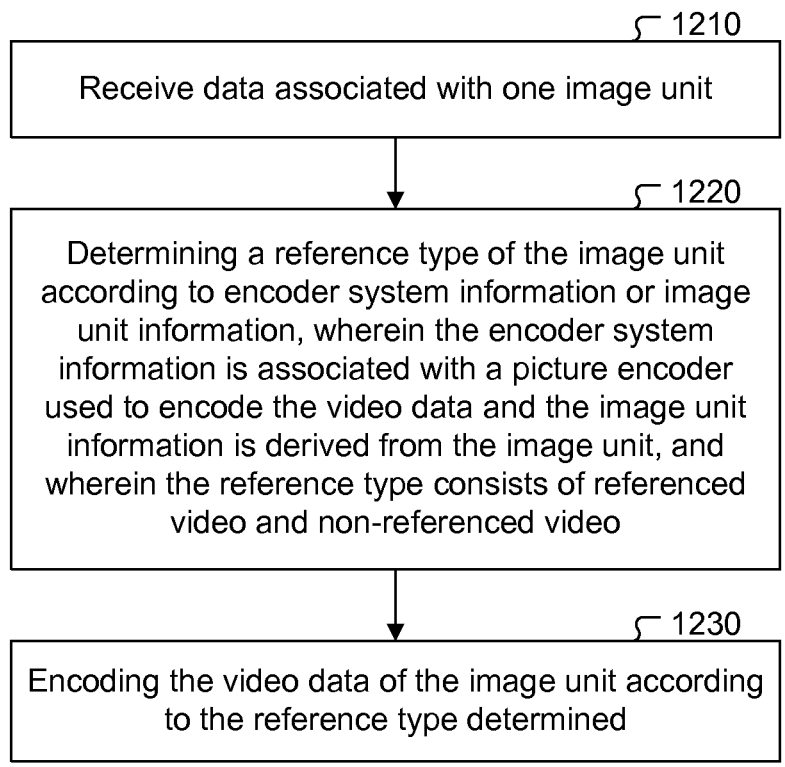
FIG. 12 illustrates an exemplary flowchart of video encoding with adaptive reference/non-reference frame selection for an image unit according to one embodiment of the invention.

FIG. 12 shows an exemplary flow chart of video coding procedure of a video coding system with adaptive reference/non-reference decision for each image unit according to the invention. To encode one image unit, the data associated with the image unit is received in step 1210. Then the reference type of the image unit is determined in step 1220. Based on the determined reference type, the image unit is encoded in step 1230. The reference type consists of referenced and non-referenced. The reference type is determined based on the encoder system information, the image unit information, or the encoder system information as well as the image unit information. The encoder system information is associated with a video coding system used to encode the video data. The encoder system information is selected from the bandwidth information, the power information, the channel capability information, the computation capability and the timing budget. The encoder system information is derived from the external devices of the video coding system. The external devices can be is in the previous or the following stage of video compressor. The encoder system information comes from at least one of the following device: frame processing engines, motion filters, positional sensors, transmission or receiving devices. The frame processing engines can be ISP, GPU or display function engine. The transmission or receiving devices can be wireless or wired devices. The conventional image unit type, such as I, P or B type, can also be determined in step 1220. The determining of the conventional image unit type and the reference type can be performed concurrently or one after another.

Figure 13:
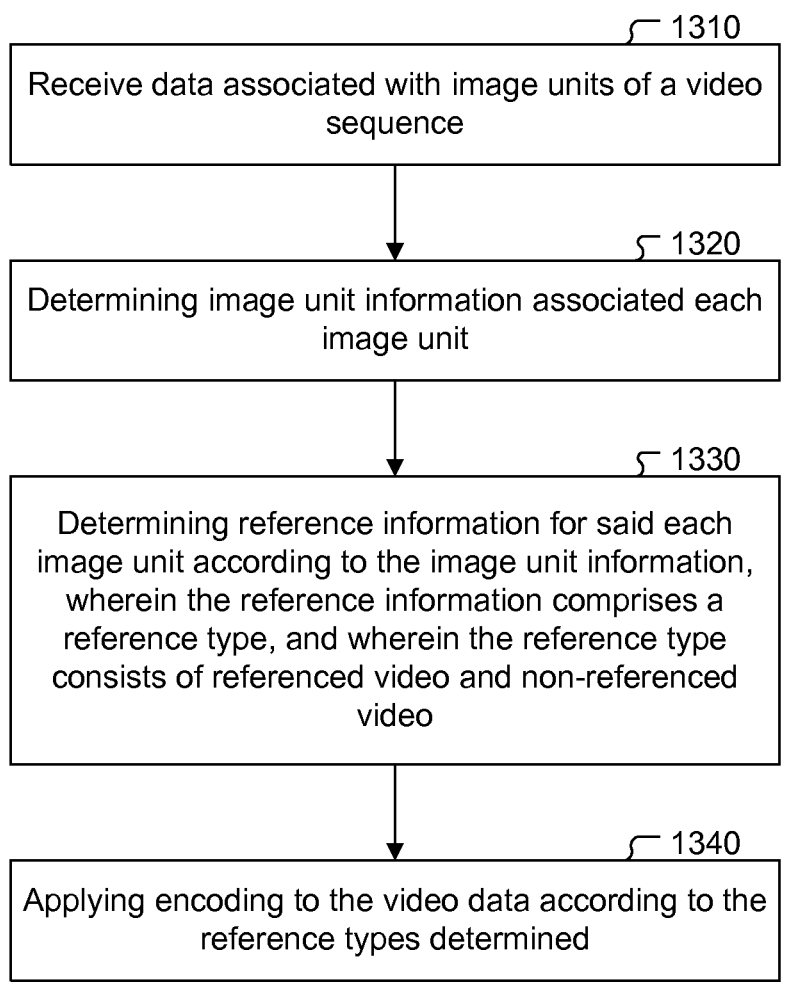
FIG. 13 illustrates another exemplary flowchart of video encoding with adaptive frame/slice type structure decision of a video sequence according to one embodiment of the invention.

FIG. 13 illustrates another flowchart of a video coding procedure of a video encoding system in which the frame/slice type structure of a video sequence is determined based on image unit information. To encode the video sequence, the data associated with the video sequence is received in step 1310. The video sequence consists of one or more image units. The image unit information associated with each image unit is determined in step 1320. The frame/slice type structure of the video sequence is determined according to the image unit information determined in step 1330. The frame/slice type structure contains the information of the reference type, the conventional image unit type and the positions of the reference frames used to predict the Interframes of the sequence. Based on the frame/slice type structure, the video sequence is encoded in step 1340.

Figure 14:
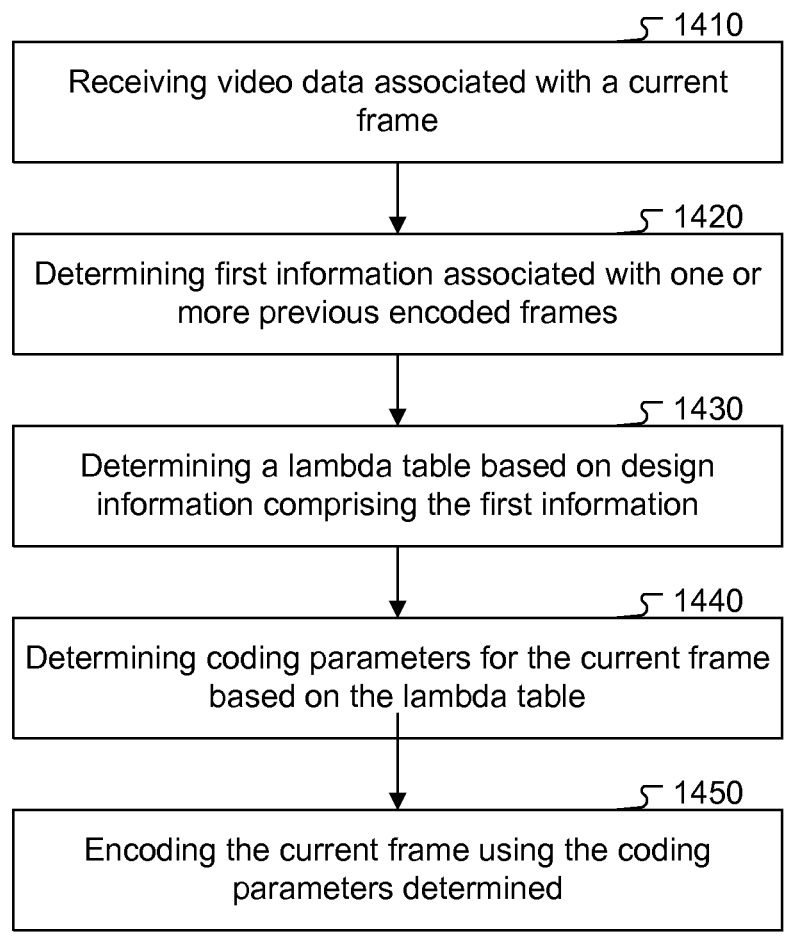
FIG. 14 illustrates another exemplary flowchart of video encoding with adaptive lambda table determination.

FIG. 14 illustrates one flowchart of a video coding system with adaptive lambda table decision according to one embodiment of the invention. After receiving the information associated with the current frame in step 1410, the information of previous encoded frames is analyzed in step 1420. Then a lambda table is determined in step 1430 for the current frame. The lambda table is determined according to the information of the previous encoded frames or together with the pre-analyzed information of input frames. Then encoding parameters are determined in step 1440 for the current frame. After all the parameters are obtained, the current frame is encoded in step 1450.

The exemplary flowcharts shown in FIG. 5 through FIG. 14 are for illustration purpose. A skilled person in the art may re-arrange, combine steps or split a step to practice the invention without departing from the spirit of the invention. Embodiment of the invention as described above may be implemented in various hardware, software codes, or a combination of both. For example, an embodiment of the invention can be a circuit integrated into a video compression chip or program code integrated into video compression software to perform the processing described herein. An embodiment of the invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video encoding method implemented in a picture encoder, the method comprising:
   receiving video data associated with an image unit of a picture;
   collecting encoder system information from one or more external devices for determining a reference type of the image unit, wherein the reference type specifies each image unit to be referenced or non-referenced by other image units; and wherein the reference type is determined according to one or more of: loading of the one or more external devices; or coding efficiency of the one or more external devices specified in the encoder system information;
   adaptively determining a reference type of the image unit according to the encoder system information and image unit information, wherein the encoder system information is associated with the picture encoder used to encode the video data and derived from the image unit and a reconstructed unit of the image unit, and the image unit information is derived from the image unit, and wherein the reference type consists of referenced and non-referenced; and
   encoding the video data according to the reference type determined.

2. The method of claim 1, wherein the image unit corresponds to one frame or one slice of the picture, and wherein each slice consists of a group of coding units.

3. The method of claim 1, further comprising determining an image unit type for the image unit, wherein the image unit type is selected from a type group comprising Intra coded reference type, Intra coded non-reference type, predicted reference type, predicted non-reference type, bi-directional predicted reference type and bi-directional predicted non-reference type.

4. The method of claim 1, further comprising: receiving encoder configuration information of the picture encoder; and modifying mode decision process in the picture encoder for encoding the image unit.

5. The method of claim 4, wherein said encoder configuration information comprises image unit type, bit-rate, frame rate, image resolution, profile, and On/Off information of coding tools.

6. The method of claim 1, wherein image unit information associated with the image unit is not referenced by other image unit in decoding process when the reference type determined corresponds to non-referenced, and wherein the image unit information is selected from a group consisting of motion vector information; orientation of Intra prediction; quantization steps; quantization parameters; a transform size; transform coefficients; and any combination thereof.

7. The method of claim 1, wherein said one or more external devices are located in a previous or following stage of a video compressor, or embedded in the video compressor.

8. The method of claim 1, wherein said one or more external devices correspond to: one or more frame processing engines selected from an image signal processor (ISP), a graphic processing unit (GPU), or a display device; one or more motion filters; one or more positional sensors; a transmission device; a receiving device; or any combination thereof, and wherein the transmission device or the receiving device is wireless or wired.

9. The method of claim 1, wherein the encoder system information corresponds to: bandwidth information; power information; channel capability information; computation capability information; timing budget information; and any combination thereof.

10. The method of claim 1, wherein the loading of said one or more external devices corresponds to quantity of bandwidth, power, channel capability, computation capability or a timing budget.

11. The method of claim 1, the method further comprising: analyzing or receiving the image unit information, and wherein the reference type is determined according to the image unit information.

12. The method of claim 11, wherein the image unit information is selected from: motion information between the image unit and at least one previous image unit; spatial information of the image unit, at least one previous image unit, or both; and temporal information extracted from the spatial information.

13. The method of claim 12, wherein the spatial information comprises pixel value, variance, Intra-prediction direction and frequency response.

14. The method of claim 11, wherein the image unit information is obtained from a first device in a previous stage of the picture encoder, a second device embedded in the picture encoder, or both.

15. The method of claim 14, wherein the first device corresponds to an image signal processor (ISP) or pre-processing elements.

16. The method of claim 1, the method further comprising: modifying mode decision process for the image unit.

17. A video encoding method implemented in a picture encoder, the method comprising:

receiving video data associated with image units of a video sequence;

determining image unit information associated each image unit;

collecting encoder system information from one or more external devices for determining a reference type of the image unit, wherein the reference type specifies each image unit to be referenced or non-referenced by other image units; and wherein the reference type is determined according to one or more of: loading of the one or more external devices; or coding efficiency of the one or more external devices specified in the encoder system information;

adaptively determining a reference structure for the image units according to the image unit information and the encoder system information associated with the picture encoder and derived from the image unit and a reconstructed unit of the image unit; and applying encoding to the video data according to the reference types determined.

18. The method of claim 17, wherein the image units corresponds to a first group of frames or a second group of slices, and wherein each slice consists of one or more coding units.

19. The method of claim 17, wherein the image unit information is selected from a group consisting of: motion information between the image unit and at least one previous image unit; spatial information of the image unit, at least one previous image unit, or both; temporal information extracted from the spatial information; and any combination thereof.

20. The method of claim 17, wherein the reference structure comprises an image unit type of each image unit, and wherein the image unit type is selected from a type group comprising reference Intra coded type, non-reference Intra coded type, reference predicted type, non-reference predicted type, reference bi-directional predicted type, non-reference bi-directional predicted type and any combination thereof.

21. The method of claim 17, wherein the reference structure further comprises reference direction and reference distance.

22. The method of claim 17, wherein the reference structure is determined after coding one or more previous image units.

23. The method of claim 17, wherein the reference structure is determined assistant with encoded information of one or more previous image units or pre-analysis information of un-coded image units, and wherein the un-coded image units are selected from current image units and the following image units.

24. The method of claim 17, the method further comprising: modifying mode decision process for said each image unit.

25. A method of video encoding implemented in a picture encoder, the method comprising:

receiving video data associated with a current frame;

determining first information associated with one or more previous encoded frames;

collecting encoder system information from one or more external devices for determining a reference type of the image unit, wherein the reference type specifies each image unit to be referenced or non-referenced by other image units; and wherein the reference type is determined according to one or more of: loading of the one or more external devices; or coding efficiency of the one or more external devices specified in the encoder system information;

adaptively determining a lambda table based on design information comprising the first information and the encoder system information associated with the picture encoder and derived from the image unit and a reconstructed unit of the image unit;

determining coding parameters for the current frame based on the lambda table; and encoding the current frame using the coding parameters determined.

26. The method of claim 25 further comprising determining second information associated with the current frame, wherein the design information comprises the second information.

27. The method of claim 26, wherein the first or the second information is selected from a group consisting of: motion vector information; Intra mode ratio; Inter mode ratio; ratio of specific coding modes; frame rate; bit-rate; encoded bits; frame type; and any combination thereof.

28. The method of claim 27, wherein the frame type is used to identify the current frame to be a reference Intra coded frame, non-reference Intra coded frame, reference predicted frame, non-reference predicted frame, reference bi-directional predicted frame or non-reference bi-directional predicted frame.

* * * * *